(12) United States Patent
Ishikawa

(10) Patent No.: US 7,139,096 B2
(45) Date of Patent: Nov. 21, 2006

(54) PRINTING SYSTEM AND PRINTING METHOD

(75) Inventor: Hisashi Ishikawa, Chiba (JP)

(73) Assignee: Canon Kabushiki Kaisha, Tokyo (JP)

(\*) Notice: Subject to any disclaimer, the term of this patent is extended or adjusted under 35 U.S.C. 154(b) by 902 days.

(21) Appl. No.: 09/983,102

(22) Filed: Oct. 23, 2001

(65) Prior Publication Data
US 2002/0089680 A1 Jul. 11, 2002

(30) Foreign Application Priority Data
Oct. 23, 2000 (JP) ............................. 2000-323197

(51) Int. Cl.
*B41J 2/005* (2006.01)
(52) U.S. Cl. ...................... 358/1.8; 358/2.99; 358/3.23; 358/1.4; 358/1.16; 347/9; 347/15; 347/41; 347/43
(58) Field of Classification Search ................. 358/1.8, 358/2.99, 3.23, 1.4, 1.16, 1.2, 426.1
See application file for complete search history.

(56) References Cited

U.S. PATENT DOCUMENTS

| | | | | |
|---|---|---|---|---|
| 4,313,124 A | * | 1/1982 | Hara | 347/57 |
| 5,450,532 A | * | 9/1995 | Bockman et al. | 358/1.16 |
| 5,638,188 A | * | 6/1997 | Moro et al. | 358/3.03 |
| 5,680,519 A | * | 10/1997 | Neff | 358/1.9 |
| 5,831,642 A | * | 11/1998 | Matsubara et al. | 347/9 |
| 5,832,184 A | * | 11/1998 | Konno et al. | 358/1.2 |
| 5,927,874 A | * | 7/1999 | Kikuta et al. | 400/120.02 |

OTHER PUBLICATIONS

Gonzales, Rafael C, Digital Image Processing, 1992, Addison Wesley Publishing, pp. 354-357.*
Gonzales, Rafael C, Digital Image Processing, 1992, Addison Wesley Publishing, pp. 354-356.*

\* cited by examiner

*Primary Examiner*—Twyler M. Lamb
*Assistant Examiner*—Robert Kang
(74) *Attorney, Agent, or Firm*—Fitzpatrick, Cella, Harper & Scinto

(57) ABSTRACT

The colors used for forming an image are limited in advance to a predetermined number of color patterns called representative colors; on the host side the image data received is divided into blocks, for each of which a representative color is determined in a representative color code conversion unit; the representative colors and their associated representative color codes are transmitted to the printer side; and on the printer side the representative color codes are converted into dot patterns in a pattern conversion unit for each pass before being output. The above procedure allows a series of processing—resolution conversion, masking/UCR processing, output γ correction and binarization processing—to be realized with a simple configuration.

10 Claims, 13 Drawing Sheets

| CYAN | MAGENTA | YELLOW | CODE |
|------|---------|--------|------|
| 0000 | 0000 | 0000 | 0 |
| 0000 | 0000 | 0001 | 0 |
| 0000 | 0000 | 0010 | 1 |
| ⋮ | ⋮ | ⋮ | ⋮ |
| 1000 | 0000 | 0000 | 127 |
| 1000 | 0000 | 0001 | 115 |
| 1000 | 0000 | 0010 | 116 |
| ⋮ | ⋮ | ⋮ | ⋮ |
| 1111 | 1111 | 1101 | 255 |
| 1111 | 1111 | 1110 | 255 |
| 1111 | 1111 | 1111 | 255 |

| CODE | CYAN | MAGENTA | YELLOW |
|------|------|---------|--------|
| 0    | 0    | 0       | 0      |
| 1    | 0    | 0       | 41     |
| 2    | 0    | 0       | 85     |
| ⋮    | ⋮    | ⋮       | ⋮      |
| 127  | 131  | 48      | 11     |
| 128  | 129  | 41      | 91     |
| 129  | 131  | 45      | 149    |
| ⋮    | ⋮    | ⋮       | ⋮      |
| 253  | 226  | 255     | 129    |
| 254  | 239  | 255     | 188    |
| 255  | 255  | 255     | 255    |

FIG.4

| CODE | DOT PATTERN | | | |
|---|---|---|---|---|
| | CYAN | MAGENTA | YELLOW | BLACK |
| 0 | | | | |
| 1 | | | | |
| ⋮ | ⋮ | ⋮ | ⋮ | ⋮ |
| 254 | | | | |
| 255 | | | | |

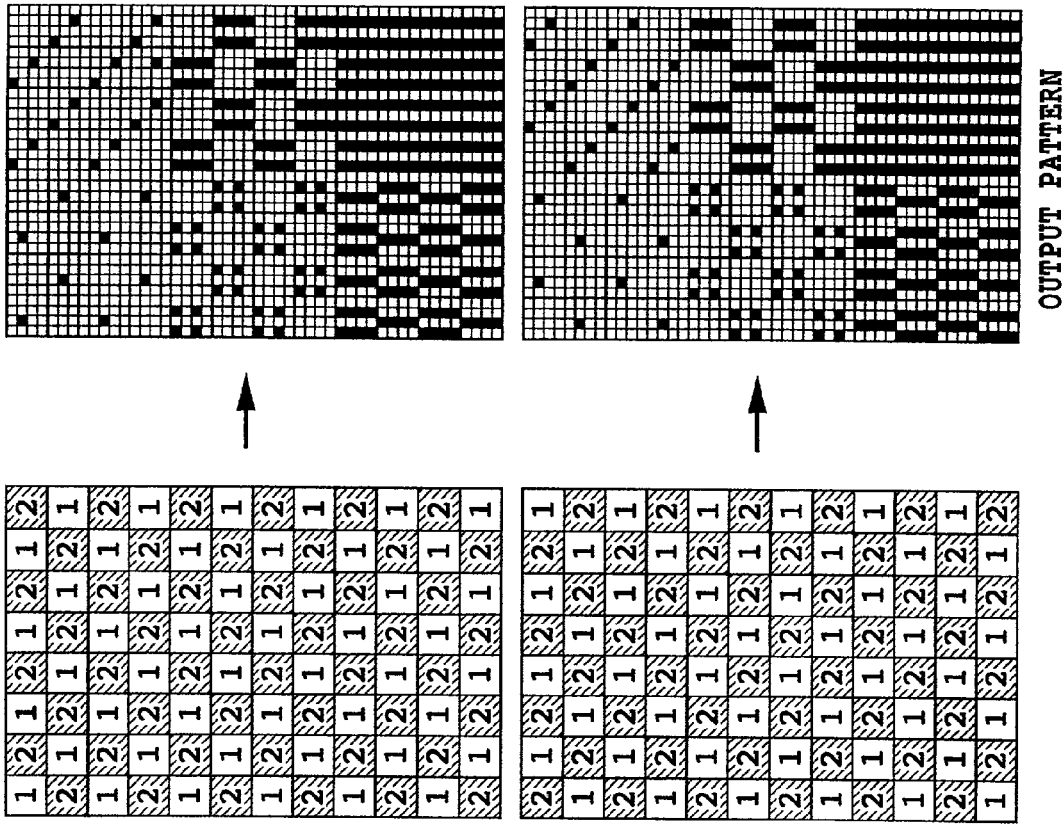

PRINTING SYSTEM AND PRINTING METHOD

This application is based on Patent Application No. 2000-323197 filed Oct. 23, 2000 in Japan, the content of which is incorporated hereinto by reference.

BACKGROUND OF THE INVENTION

1. Field of the Invention

The present invention relates to a printing apparatus for and a printing method of forming pixels with dot patterns and more specifically to image processing in a printing apparatus that performs a so-called multipass printing in which the same line is printed in a plurality of scanning operations of a print head each using different nozzles.

2. Description of the Prior Art

As information processing equipment such as computers have come into wide use in recent years, printing apparatus, such as printers, that are peripheral devices of the computers are also becoming rapidly widespread. At the same time as the general trend for higher quality and color representation of visual information in the information processing equipment accelerates, there are also growing demands on the printing apparatus for a higher print quality and for a color printing capability.

A well-known printer image processing method is an image processing technique based on a color halftone model.

FIG. 13 is a block diagram showing an example of a conventional image processing unit used in a printer.

Image data in the form of an RGB signal is input from an input terminal 101, converted into a resolution level compatible with that of the printer by a resolution conversion unit 102, and then converted into a CMY density signal for each pixel by a density conversion unit 103. The image data, after being converted from the RGB signal into the CMY density signal, is further converted by a black generation unit 104 into a density signal that includes a black density signal K. The image data now in the form of a CMYK density signal is subjected to under color removal processing and masking in a masking/UCR unit 105 whereby the image data is converted into a halftone area signal, a CMYK density signal that has its crosstalk component compensated for. Next, the image data in the form of the halftone area signal is γ-corrected by an output γ correction unit 106 to compensate for a linearity between the halftone area signal and the output density as by dot gain processing. Then, the image data is converted into binary data (referred to also as "bit map data") for each color component by a binarization unit 107 and is output from a host side interface unit 108 to a transmission line 201.

The bit map data transmitted from the host side interface unit 108 is taken into the printer through a printer side interface unit 109. Further, in an H-V conversion unit 110 the bit map data has its output order converted in accordance with a driving order of a print head. A mask generation unit 111 generates a thinning pattern (mask data) for multipass printing and gives it to a head driver 112, which in turn thins the converted bit map data according to the mask data from the mask generation unit 111. Based on the thinned bit map data, the print head 113 is driven to eject ink during each of the scans with a paper feed operation performed between the scans. An image is thus formed by multipass printing.

As described above, in printing a single scan line the multipass printing involves dividing the bit map data for the same scan line into a plurality of parts and performing a plurality of passes and a predetermined amount of paper feed between the individual passes to eject ink from different nozzles of the print head in each of the passes according to the divided bit map data for the same scan line, thus forming an image for the same line. This multipass printing can reduce unevenness in printing due to dot landing deviations, variations in ink ejection volume and ink penetration time differences.

The density conversion unit 103 and the output γ correction unit 105 are normally integrated into a lookup table (LUT), rather than being provided individually with processing circuits and software. This arrangement can shorten the processing time.

The conventional image processing method described above, however, has the following problem.

As the resolution of printed images and the printing speed in the printer tend to increase, the amount of image data processed by the image processing unit also increases. With the conventional method, however, the resolution conversion, density conversion, black generation, masking/UCR, output γ correction, binarization, H-V conversion, and mask processing are all successively performed independently. Hence, processing such a large amount of image data according to the conventional method will take relatively long and the circuit and the amount of calculations required will inevitably become huge.

Further, as the number of dots in a dot pattern that forms a pixel increases, i.e., as the number of gray scale levels increases, the binarization processing becomes more complicated and the amount of calculations increases.

Further, the memory capacity required for the H-V conversion increases as the printer resolution and the width that can be printed in one pass increase or, in a more general term, as the number of nozzles in the print head increases. This gives rise to another problem that when the resolution is enhanced, the memory capacity required for processing increases in proportion to the square of the resolution.

Further, high-resolution printers tend to have an increased number of nozzles integrated in the print head and make ink droplets ejected from these nozzles smaller to reduce dot diameters and thereby realize higher resolutions. Since the ink droplets ejected from the nozzles of such a print head are very small, dot position variations due to landing deviations are apt to become large relative to the dot diameter. Thus even the multipass printing described above may not be able to eliminate image quality degradations caused by printing variations. Further, the multipass printing often uses a checker pattern as the mask pattern in the mask processing. When such a mask pattern is used, problems may arise in which dots that need to be printed fail to be printed or dot printing concentrates on a particular pass.

SUMMARY OF THE INVENTION

The present invention has been accomplished in light of the problems described above and it is an object of the present invention to provide a printing system and a printing method with a low cost and a reduced processing time and with a capability to take full advantage of features of the multipass printing.

According to one aspect, the present invention provides a printing system, which uses a print head having a plurality of print elements, performs a plurality of scan operations of the print head over the same area, and allocates different print elements to each of the plurality of scans for printing, the printing system comprising: a code table from which to output representative color codes based on input color data;

and a pattern generation means for generating dot patterns of the representative color codes according to a correspondence between the input color data and the representative color codes; wherein the dot pattern generation means stores the dot patterns and outputs in each of the plurality of scans the associated dot pattern.

According to another aspect, the present invention provides a printing method, which uses a print head having a plurality of print elements, performs a plurality of scan operations of the print head over the same area, and allocates different print elements to each of the plurality of scans for printing, the printing method comprising the steps of: outputting representative color codes from a code table based on input color data; and generating dot patterns of the representative color codes according to a correspondence between the representative color codes and the dot patterns; wherein the step of generating the dot patterns outputs in each of the plurality of scans the associated dot pattern.

With the printing apparatus and method described above, the processing time can be shortened by replacing the image data with dot patterns of the representative color codes before printing.

The above and other objects, effects, features and advantages of the present invention will become more apparent from the following description of embodiments thereof taken in conjunction with the accompanying drawings.

BRIEF DESCRIPTION OF THE DRAWINGS

FIG. 2 is a diagram showing the structure of a code table.

FIG. 4 is a diagram showing structure of an output density table.

FIG. 5 is a diagram showing the structure of a pattern table.

FIG. 6A is a diagram showing the structure of a dot pattern 1 and FIG. 6B is a diagram showing the structure of a dot pattern 2.

FIG. 7A illustrates bit map data before being divided and FIG. 7B illustrates the structures of dot patterns divided into 2-pass printing.

DESCRIPTION OF THE PREFERRED EMBODIMENT

Embodiments applying the printing apparatus and printing method according to the present invention will be described by referring to the accompanying drawings.

(Embodiment 1)

Figure 1:
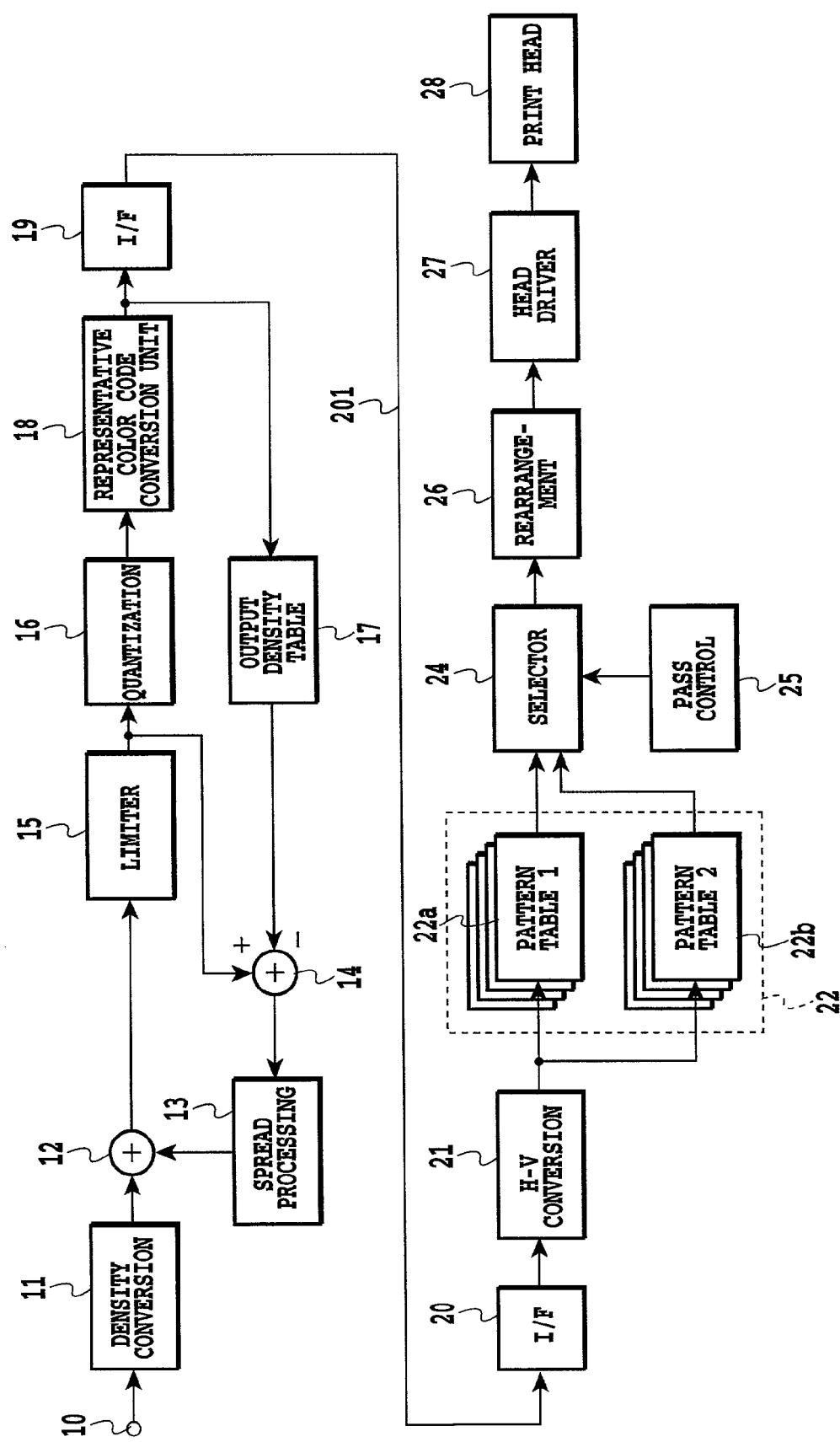
FIG. 1 is a block diagram showing an image processing unit according to the present invention.

FIG. 1 is a block diagram showing an image processing system as one embodiment of this invention.

The image processing system comprises a system on the host side and a system on the printer side. The host side system comprises an input terminal 10, a density conversion unit 11, an addition unit 12, a spread processing unit 13, a subtraction unit 14, a limiter 15, a quantization unit 16, an output density table 17, a representative color code conversion unit 18, and a host side interface unit 19. The printer side system comprises a printer side interface unit 20, an H-V conversion unit 21, a pattern conversion unit 22, a selector 24, a pass control unit 25, a rearrangement unit 26, a head driver 27, and a print head 28.

In this embodiment, for input data having a coordinate unit of 300 ppi (pixels per inch), dots that are actually formed are output at a resolution of 1200 dpi (dots per inch).

That is, one pixel is formed by using a 4×4-dot pattern. 4×4 dots are treated as one unit and referred to also as a "block."

The processing performed on the host side from the input terminal 10 to the host side interface unit 19 is actually executed as printer driver's processing.

A rough flow of processing in the image processing system of the above construction is as follows.

First, image data in the form of an RGB signal is entered into the input terminal 10 for each pixel. The image data is converted into a CMY density signal by the density conversion unit 11. It is assumed here that the CMY density signal does not exceed the reproduction range of a representative color described later. To the image data converted into the density signal the addition unit 12 adds an error signal. The image data which is added the error signal then is limited by the limiter 15 to prevent a possible gray scale inversion. Next, the limited image data is quantized by the quantization unit 16. In this embodiment, the image data for each pixel which consists of 8 bits in each CMY color is quantized into image data with four bits in each color by discarding the lower four bits of the data. The quantization is not limited to this method and other methods, such as rounding the lower four bits, may be used.

Next, the representative color code conversion unit 18 converts the quantized CMY 4-bit image data into a representative color code that corresponds to this data. In this embodiment, 256 different colors uniformly distributed in a predetermined color space are selected as "representative colors" in advance. These representative colors are assigned "representative color codes" for identification. Then, color data, a combination of each CMY four-bit data, is matched with a representative color code whose color is closest to the one presented by the color data. This match or correspondence is set in a code table 181 (see FIG. 2) in the representative color code conversion unit 18. That is, by referencing the code table 181 through an address based on the CMY 4-bit image data entered into the representative color code conversion unit 18, the corresponding representative color code can be determined.

The representative color code thus determined is sent from the host side to the printer side. That is, the representative color code is output from the host side interface unit 19 through the transmission line 201 of a printer cable to the printer side interface unit 20 and the H-V conversion unit 21. In this embodiment, errors produced as a result of coding the image data are processed by the spread processing unit 13 and others and the detail of the error processing will be explained later. The structure of the code table 181 and the representative color will also be detailed later.

On the printer side, the H-V conversion unit 21 changes the order in which the representative color code data received is to be read out, according to the arrangement of the ink ejection nozzles in the print head. That is, the H-V conversion unit 21 converts raster data sent from the host side for each line into data that corresponds to the nozzle arrangement of the print head, changing the horizontally arranged data into vertically arranged data.

Next, the pattern conversion unit 22 outputs the dot pattern data corresponding to the entered representative color code as the print head makes each pass in the multipass scan operation. That is, the pattern conversion unit 22 has pattern tables 22a, 22b (see FIG. 6) each of which contains blocks of dot pattern data for each YMC color that correspond to respective representative color codes. These pattern tables 22a, 22b contain dot patterns for each of two passes in the multipass printing of this embodiment as described later. The structure of the pattern tables and the multipass printing based on the pattern tables will be detailed with reference to FIG. 6 and FIG. 7.

Next, of the dot pattern data output from the two pattern tables 1 and 2, the selector 24 selects and outputs the dot patterns from the pattern table specified by a control signal from the pass control unit 25. In this way, in the multipass printing consisting of two passes, it is possible to output the dot patterns that correspond to each pass. Next, the rearrangement unit 26 rearranges the dot patterns in the order in which they are to be output from the print head 28. The head driver 27 according to the rearranged dot patterns drives the print head 28 for printing. The conversion into the output dot patterns by the pattern conversion unit 22 and the rearrangement into the head drive data by the rearrangement unit 26 are performed in synchronism with a head drive signal. The CMYK heads are spaced a predetermined distance from each other in many printing apparatus. Thus, in these apparatus the processing performed in and following the H-V conversion unit 21 is executed for each color independently. That is, the tables in the pattern conversion unit 22 are provided for each color, and for each representative color code entered, dot patterns, one for each C, M, Y and K, are output successively in synchronism with the head drive signal.

During the processing described above, the errors produced when the representative color code conversion unit 18 changes the image data from the CMY density signal to the representative color code is processed as follows. The output density table 17 stores colors reproduced by the printer of this embodiment, i.e., density data for Y, M, C which are obtained by printing dot patterns corresponding to the representative color code, as will be described with reference to FIG. 4. The output density table 17 outputs the reproduced color data corresponding to the representative color code entered from the representative color code conversion unit 18. The density data of each of Y,M,C can be obtained by such techniques as optical density detection and color measurement. The subtraction unit 14 determines a difference between the reproduced color and the input color, i.e., calculates an error of the output density with respect to the input density for each of Y, M and C. The spread processing unit 13 generates error signals for surrounding pixels to spread the error over the surrounding pixels by a known error spreading method. The error signals thus generated are added to the image data by the addition unit 12 as described earlier.

According to the flow described above, the input image data is processed to perform the 2-pass printing using the print head 28.

Figure 13:
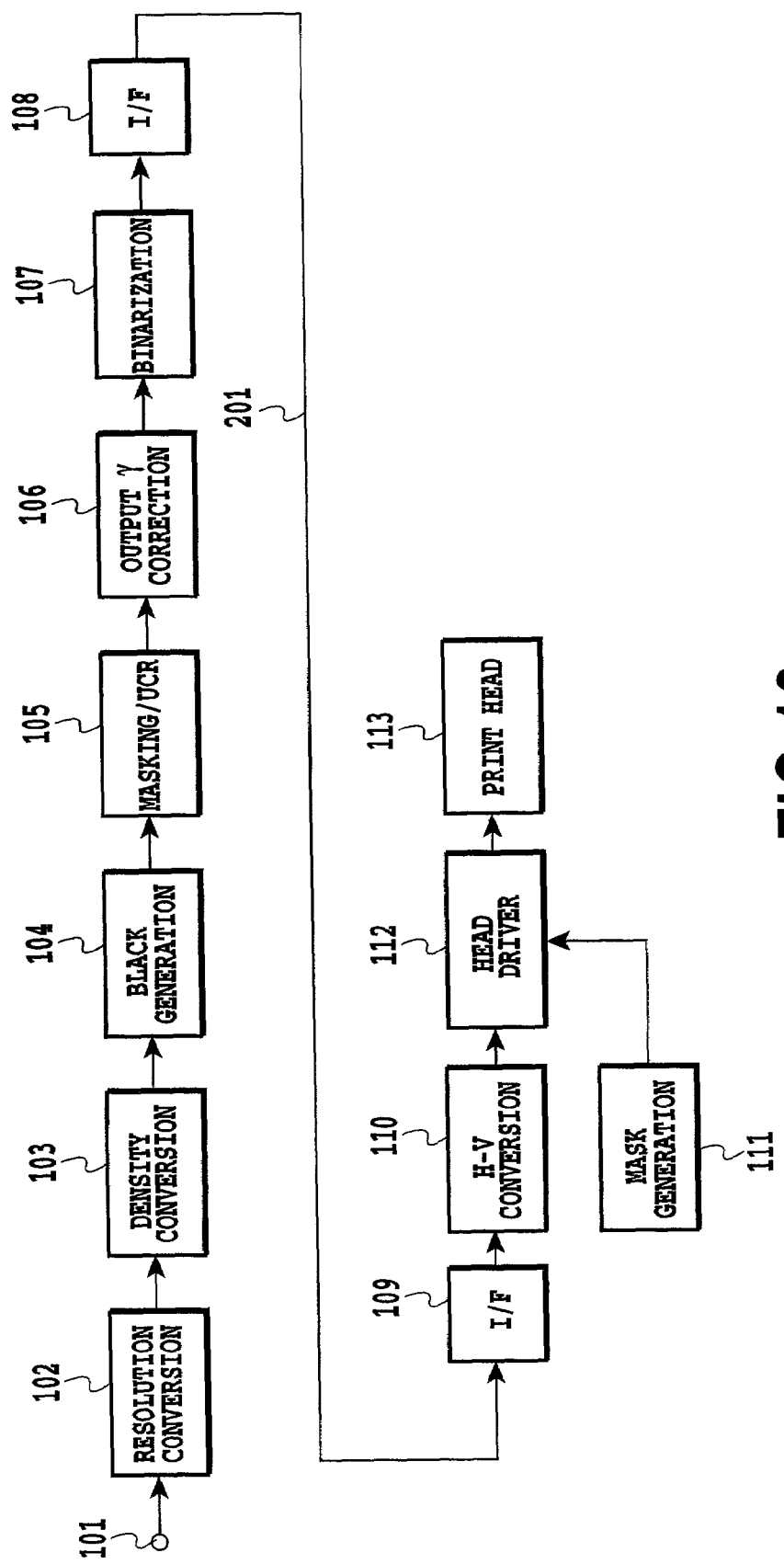
FIG. 13 is a block diagram showing a conventional image processing unit.

As described above, the image processing using the representative color code according to this embodiment enables the color processing, ranging from the conventional density conversion to the output γ correction as described with reference to FIG. 13, and the successive binarization processing to be performed integrally. The representative color code and the representative color will be described in more detail in the following.

The representative colors, as explained earlier, are selected in advance from among colors uniformly distributed in a predetermined color space.

In the image processing system of this embodiment, as already explained, the data processing for each pixel to print C, M, Y, K dot patterns of 1200 dpi is performed using 300 ppi coordinates. Thus, the dot pattern has 4×4 dots for each pixel. To represent C, M, Y, K and a color produced from a combination of C, M, Y, K essentially requires 4×4×4=64 bits. In this embodiment, however, an 8-bit representative color code is used. Thus, data compression by a factor of $8/64=1/8$ is possible. Compared with the $2^{64}$ different colors represented by the 64 bits, the number of colors that can be perceived by humans is significantly small. With precision variations in output dot position, dot diameter and dot density also taken into consideration, it is possible to significantly reduce the number of colors and still produce an output image that is hardly different from an image based on $2^{64}$ colors if the representative colors are properly selected. In this embodiment the following method is used in selecting representative colors and replacing the input image data with the selected representative colors to reduce the number of colors for use in image formation and compress the image data. Because the image data can be compressed in this way, the volume of data transmitted over the transmission line 201 can be reduced. This can not only shorten the transmission time but greatly reduce the memory capacity required by the H-V conversion unit 21.

The representative colors may be selected in the following two methods. A first method involves printing patches of all possible dot patterns on the printer with a 4×4-dot block shown in FIG. 5 taken as a unit, measuring the colors of the printed patches of each pattern, and selecting, as representative colors from among all the measured dot patterns, those colors that are uniformly distributed in a predetermined color space (for example, an input CMY space and an L*a*b* space).

Since there are $2^{64}$ dot patterns in all as described above, measuring the colors of all dot patterns, as specified in the first method, is not practical.

A second method involves modeling a relation between the dot patterns and the colors formed by printing the dot patterns, calculating the colors corresponding to all dot patterns, and selecting as representative colors those colors that are uniformly distributed in a predetermined color space. In more concrete terms, the number of patterns is reduced by placing a limitation on the number of mixed colors and by eliminating those patterns that are found identical through rotation and mirroring of images. Then the known modeling using, for example, a color halftone model is performed to further reduce the number of patterns down to a level where the color measurements of the available patterns are feasible. This is followed by the patches being printed and actually measured in the same way as the first method. Then those colors uniformly distributed in a predetermined space color are selected as representative colors. When printed colors are measured, some limitations (rules) may be imposed which include eliminating those dot patterns with large measurement variations as unstable patterns and preventing those patterns of sparsely distributed dots from being removed in order to alleviate the granularity of highlight areas.

The reduction in the number of representative colors by using the color halftone model is achieved as follows.

A test pattern is printed for each combination of overlapping ink colors and measured in advance to determine a density (hereinafter referred to as an "assessment value") for each combination of overlapping inks. Further, by taking statistics of dots the printer forms on a print medium, an equivalent dot diameter is determined for each ink.

Then, an area ratio of each combination of overlapping inks to each dot pattern is determined from the equivalent dot diameter of the ink, the dot pitch determined from the resolution, and the dot arrangement in the dot pattern. A product of the area ratio and the assessment value for each combination of overlapping inks is calculated and a sum of these products in each dot pattern is taken to be a reproduced color value of the dot pattern. Next, a difference is taken between the reproduced color values of different dot patterns. If a combination of dot patterns is found for which this difference is less than a predetermined level ($\Delta E$), one of the dot patterns whose density is lower, i.e., whose reproduced color value is smaller, is removed from the candidates for the representative colors. This process is repeated. If a predetermined number or more of the representative color candidates still remain even after the combinations whose reproduced color value difference is less than the predetermined level ($\Delta E$) have been processed and eliminated, the value of the predetermined level ($\Delta E$) is increased and the above-described process is repeated until the number of representative color candidates falls below the predetermined number. The representative colors are determined in this manner.

As described above, in this embodiment, the representative colors are matched to their 4×4-dot patterns. FIG. 5 shows the correspondence between the representative color codes generated by the representative color code conversion unit 18 (see FIG. 1) and the dot patterns for each of C, M, Y, K colors. As shown in the figure, the selected 256 representative color codes are matched to dot patterns for each CMYK color. Printing these patterns produce the corresponding representative colors.

Figure 3:
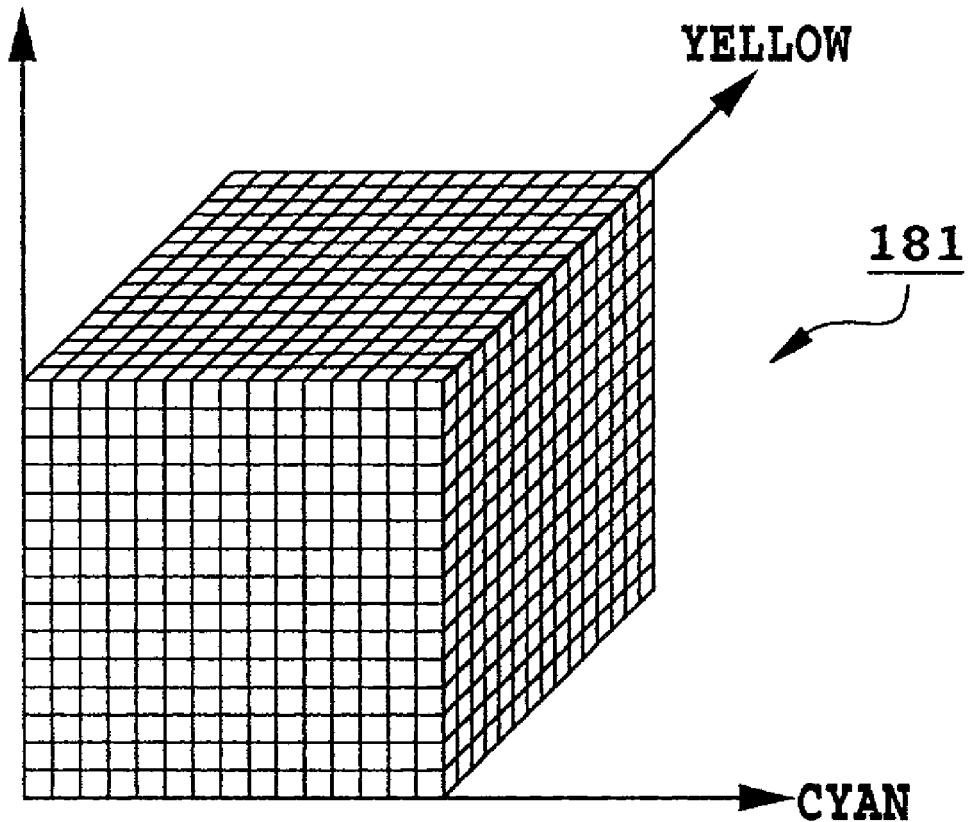
FIG. 3 is a conceptual diagram showing a hue among cyan, magenta and yellow.

The representative color codes are output from the representative color code conversion unit 18 for each input color data C, M, Y. That is, the code table 181 of the representative color code conversion unit 18 assigns the color represented by four bits of each CMY with a representative color code that should be output. Each of the CMY colors has 16 possible representations and thus a total of 16×16×16 different color representations is possible. FIG. 2 and FIG. 3 illustrate a concept of the code table 181. The position of each lattice point in a cubic lattice is represented by the four bits for each of C, M, Y. The representative color codes are mapped in these lattice point.

The mapping of the representative color code in the code table is performed as follows. First, the 4-bit density data for C, M, Y representing a lattice point are converted into quantized representative values. The quantized representative value is produced by a conversion formula of "sum of weight of each bit+quantization step/2" which converts a 4-bit value into an 8-bit value. The lattice point which is converted into quantized representative values is expressed as x(C', M', Y'). This method is used because, in processing the input data, the conversion is done by the quantization unit 16 by discarding the lower four bits of the input image data. If the quantization unit 16 performs rounding rather than omitting the lower four bits, a value with the lower four bits set to 0 may be used.

Next, the color measurement value of the representative color that is related by the output density table 17 described later is given as a(C, M, Y). The distance between the lattice point x and the color measurement value a is determined as follows.

$$r^2=(a-x)^2=(C-C')^2+(M-M')^2+(Y-Y')^2 \quad (1)$$

A representative color is determined which corresponds to a value a for which the distance r determined above is minimum. This representative color is taken as the representative color code that is to be mapped in the lattice point.

An error represented as the distance r is spread over the adjoining pixels by the spread processing unit 13 using the conventionally known error spreading method. Although in this embodiment the square of the distance between the color measurement value of the representative color and the quantized representative color is determined, it is also possible to determine an absolute value of the distance and then determine a representative value for which this absolute value is minimum. While the quantized representative value uses a center value of the quantized value, it is not limited to the center value. The quantized representative value may be a wholly or partly shifted value.

Further, although in the above embodiment an input to the output density table 17 is used as the representative color code, the CMY signal after quantization may be used as the code. In that case, the code table 181 and the output density table 17 may be integrated as one table so that the representative color code and the output density value (color measurement value) can be obtained in one LUT search. This further enhances the speed of the processing. If the representative color code is 8 bits long, because the output density value is 24 bits (8×3=24) long, the code table 181 will have a 32-bit (8+24=32) output, which provides good matching when the host performs processing in 32 bits. Furthermore, for an input outside the color reproduction range, the value is corrected before being stored in order to prevent color reproduction errors from accumulating. This can prevent possible color deviations outside the color reproduction range of the printer.

Next, we will explain about the output density table (see FIG. 1) used to determine errors that are produced as a result of converting an input color into a representative color code.

FIG. 4 conceptually illustrates the output density table 17 of this embodiment.

The output density table 17 matches a representative color code to a combination of 8-bit CMY densities. The density data to be stored in this table can be determined as follows. First, patches of a dot pattern corresponding to each representative color as shown in FIG. 5 are output on the printer of this embodiment and the color measurement is made of these patches. In this color measurement patch positions are separated from each other, and two or more measurements are taken and averaged. Then, the average measurement values (X, Y, Z) are substituted into the following equation to convert them into an RGB signal in an NTSC space.

$$R=(1.910X-0.532Y-0.288Z)/100$$

$$G=(-0.985X+1.999Y-0.028Z)/100$$

$$B=(0.058X-0.118Y-0.898Z)/100 \quad (2)$$

Next, the RGB signal is substituted into the following equations to determine an RGB density (Dr, Dg, Db).

$$Dr=-\log_{10}(R)$$

$$Dg=-\log_{10}(G)$$

$$Db=-\log_{10}(B) \quad (3)$$

Then, the density value is normalized for conversion into an input color space.

$$C=(Dr-D\min)\times 255/(D\max-D\min)$$

$$M=(Dg-D\min)\times 255/(D\max-D\min)$$

$$Y=(Db-D\min)\times 255/(D\max-D\min) \quad (4)$$

The measured value obtained through conversion as described above is stored at an address of the corresponding representative color code in the output density table 17. While the method of conversion into the input color space uses a log function for conversion into the RGB density, it is not limited to this example but may use LUT. When one wishes to shift the output color of the printer from the input color, as in a gamut compression, this can be achieved by counter-correcting the value to be stored in the output density table 17. For example, when a gamut compression is to be made, the value of the reproduction color data is shifted slightly at a time toward the outside of the color reproduction range of the printer so that the reproduction color data encloses the color reproduction range in the input color space. The reproduced CMY colors for blank(white) are all set to 0.

Next, an explanation will be given to the pattern conversion unit 22(see FIG. 1), a feature of this invention, which stores dot patterns corresponding to respective representative color codes.

The pattern tables 1 and 2 in the pattern conversion unit 22 comprise, as described earlier, representative color codes and their corresponding dot patterns. Printing is done according to the dot patterns as described above.

In the multipass printing, the print data is conventionally thinned by a predetermined mask pattern for each pass. Because the thinning is done in units of dots, in areas where the density is low there is a possibility that the thinning (mask) pattern and the print pattern may interfere with each other, resulting in the number of printed dots becoming uneven between the passes. To deal with this problem, this embodiment prepares the same number of pattern tables as that of the passes and stores these pattern tables by relating them with the respective passes. In printing, the dot patterns are output according to the representative color codes stored in the pattern table associated with the current pass being executed, thus printing an image based on this dot pattern data.

Next, how the pattern table is divided will be explained in more detail by taking a two-pass printing for example.

Figures 6A, 6B:
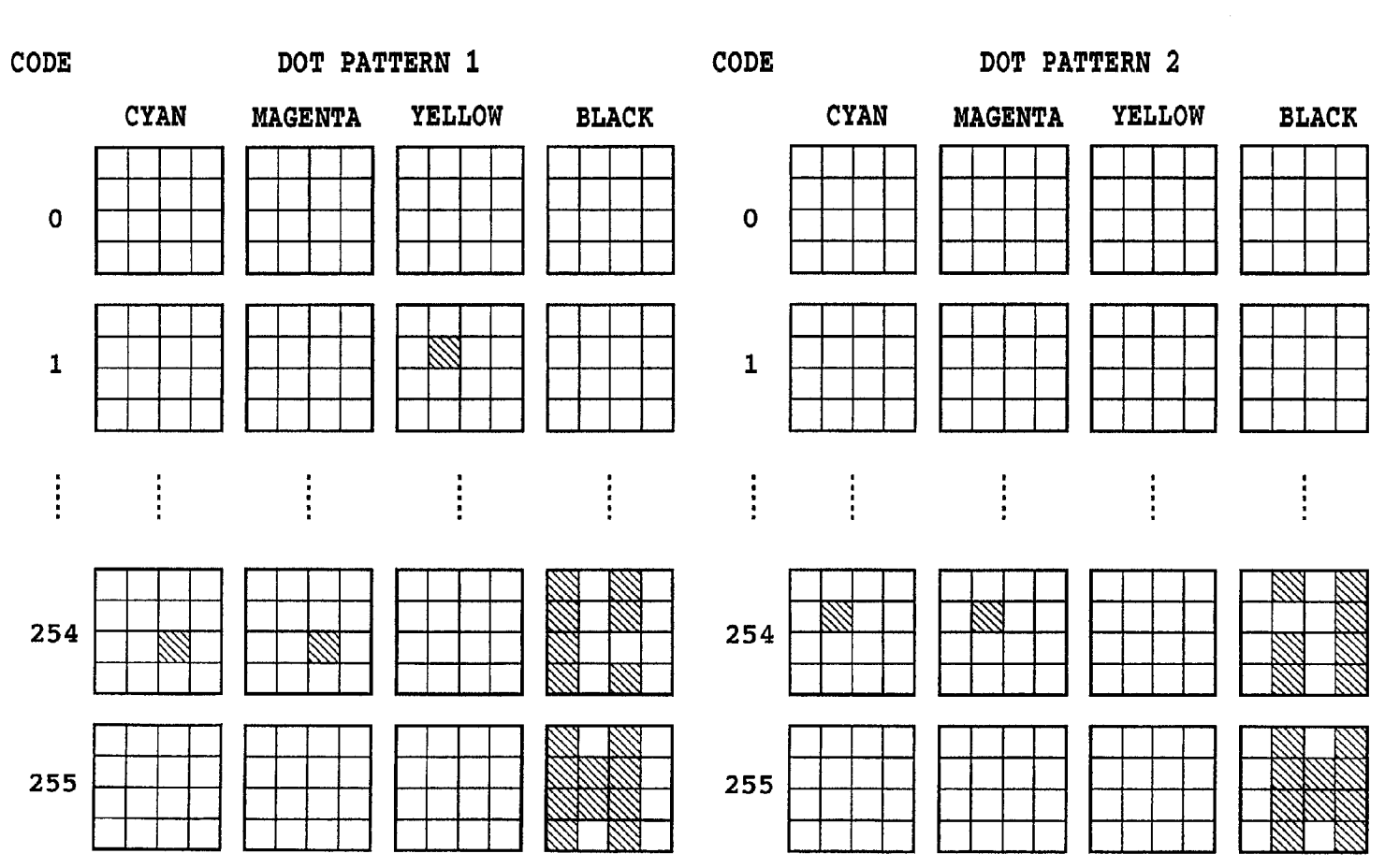

FIG. 5 shows the correspondence between the representative color codes and the dot patterns before the pattern table is divided. Dot patterns for four CMYK colors are each matched with a representative color code. In the 2-pass printing, the dot patterns shown in the figure are each divided into two dot patterns of FIG. 6A and FIG. 6B. The dot division is performed by ensuring that the necessary dots are divided into both pattern tables. In the case of a representative color 255, for example, simply dividing the cyan and magenta patterns into two tables according to the checker pattern will result in the dots being heavily allocated only to one table. This embodiment, therefore, takes steps to ensure that the dots are equally divided between the two pattern tables 22a (see FIG. 6A) and 22b (FIG. 6B).

The dot outputs from the two tables in principle do not overlap. In the representative color 255, however, the dot output is set so that several dots overlap each other. That is, the total number of dots in the two pattern tables 22a, 22b associated with the representative color code 255 is 20, which is larger than the total number of dots of 16 before the pattern table is divided. This means that several dots in the block overlap between the first pass and the second pass. This is done to increase the density of solid black.

By dividing the dot pattern table according to the number of passes in the multipass printing, it is possible to change the dividing method, the number of dots to be ejected, and the color overlapping for each representative color.

The image processing is performed in this way using the code table 181, output density table 17 and pattern tables 22a, 22b prepared in advance to perform the multipass printing. Next, the process of printing will be explained. In this embodiment the multipass printing is adopted.

FIG. 7 shows a concept for the multipass printing according to this embodiment.

FIG. 7A shows bit map data before being divided. In this embodiment the bit map data is printed in two passes, so the print data is divided according to the representative color codes into two print data, as shown at top left and bottom left in FIG. 7B, by the pattern conversion unit 22. In this embodiment, the dot pattern division is made in such a way that the output is produced every other dot and not produced at the last column with respect to the direction of main scan. Here, the dot diameter is set to about two times the dot pitch, and when the number of output dots in the 4×4-dot block is 8 or less, the pattern table 22B (dot pattern 2 in FIG. 6) is set to blank. This step is taken to eliminate possible degradations of print quality that may be caused by landing deviations and paper feed errors. Numbers in the figure identify the pattern table to be used. The selector 24 uses an output from the pattern table 22a (see FIG. 6A) when the number is "1" and an output from the pattern table 22b (see FIG. 6B) when the number is "2." Each square in the figure represents one block. The final print output is an image produced by combining a top right pattern and a bottom right pattern of FIG. 7B. Although the final print output image differs from the original bit map data, the adverse effects from the landing deviations are alleviated because the dot diameter is set to about two times the dot pitch and the blocks in an intermediate-to-low-density range where density variations appearing as lines become conspicuous are output in a single pass.

Further, in the dot pattern showed in FIG. 6A and 6B, the mask block is formed 4×4-dot, such that has a resolution of 300 dpi. Therefore, dots in one block within 300 dpi are formed in one pass. Hence, the printing unevenness that occurs within the one block of 300 dpi is mostly attributable to the head characteristic alone and thus corrected by the 300-dpi mask block. The printing variations due to an accuracy of printing mechanics, such as paper feeding mechanics, occur at the boundary of the block of 300 dpi and are distributed over an entire image. Therefore in this embodiment, to reduce density variations appearing as horizontal lines in the output image such as the printing unevenness that is occurred by paper feeding, the dot density of the dot pattern in the vertical direction is increased, such as code "254" or "255" in FIGS. 6A and 6B.

The output density table 17 uses values actually measured during the multipass printing, so that the density deviations caused by differing dot patterns are corrected each time the output density table 17 is updated.

In this embodiment, because the CMY density data is directly converted into representative color codes by using the code table 181 and sent to the printer side, the conventionally performed processing, such as resolution conversion, masking/UCR conversion and output γ correction, can be integrated into a simple arrangement. The code table 181 is generated based on the output density table 17 that is obtained by measuring the colors of patches, so the black generation processing does not need to be executed independently, thus reducing the processing time compared with the conventional arrangement.

In this embodiment, because the dots are not contiguous in the main scan direction, when the head is driven at the same ejection frequency, the scan speed in the main scan direction can be doubled.

(Embodiment 2)

Figure 8:
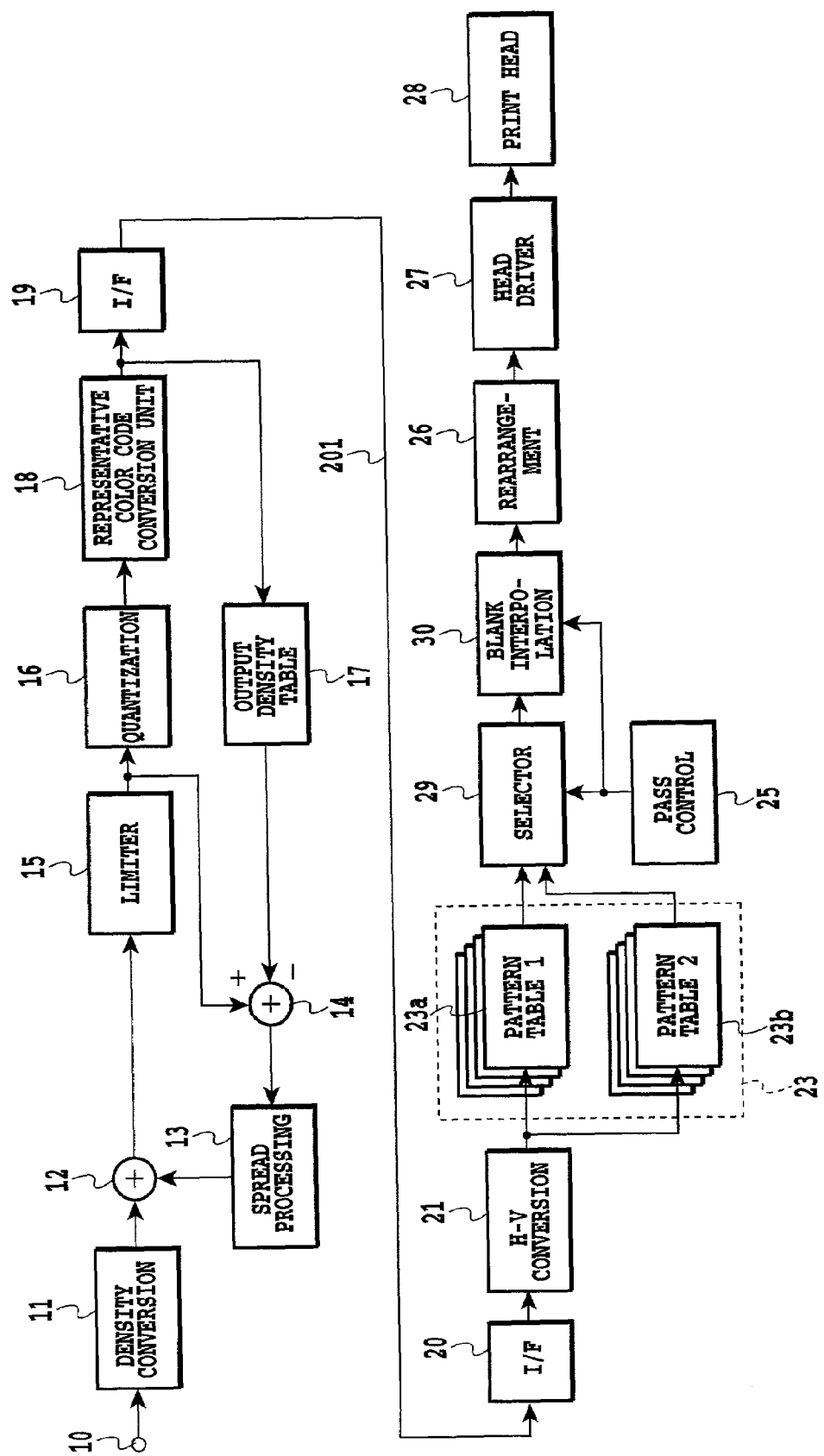
FIG. 8 is a block diagram showing another example of the image processing unit.

FIG. 8 shows a block diagram of a second embodiment of the image processing system according to the present invention. The configuration on the host side is the same as that of the embodiment 1, whereas on the printer side the pattern tables used in the pattern conversion unit 23 following the H-V conversion unit 21 differ from those of the embodiment 1. After the selector 29 there is provided a blank interpolation unit 30 before the rearrangement unit 26.

In this embodiment, the pattern tables 23a, 23b omit those dots that are always blank in the pattern tables 22a, 22b of the embodiment 1. By removing blank dots the capacity of the pattern tables can be reduced.

The pattern conversion unit 23 converts the input representative color code into an output dot pattern associated with the pass by using the pattern tables 23a, 23b.

The selector 29, according to a control signal from the pass control unit 25, selects one dot pattern from the outputs of the pattern tables 23a, 23b.

The blank interpolation unit 30, according to the control signal from the pass control unit 25, adds blanks omitted from the pattern tables 23a, 23b to the dot pattern entered from the selector 29, thus generating a dot pattern of normal size. The processing following the interpolation of blanks is similar to that of the embodiment 1 and thus its explanation is omitted.

How the blanks are omitted from the pattern tables 23a, 23b will be described in detail.

In the high-speed 2-pass printing shown in FIG. 7, for example, the pattern table 22a leaves even-numbered columns always blank and the pattern table 22b leaves the right end column always blank. Thus, the pattern table 23a stores data of the pattern table 22a removed of the even-numbered columns, and the pattern table 23b stores data of the pattern table 22b removed of the right end column. Then, when the selector 29 selects the pattern table 23a, the blank interpolation unit 30 adds blanks to the even-numbered columns and, when the selector 29 selects the pattern table 23b, adds blanks to the right end column to form dot patterns as shown at top right and bottom right in FIG. 7. By removing blanks in this way the capacity of the pattern table 23a is reduced to one-half that of the pattern table 22a and the capacity of the pattern table 23b to three fourths that of the pattern table 22b.

(Embodiment 3)

This embodiment performs a mask-based thinning for each printing pass without using pattern tables.

Figure 9:
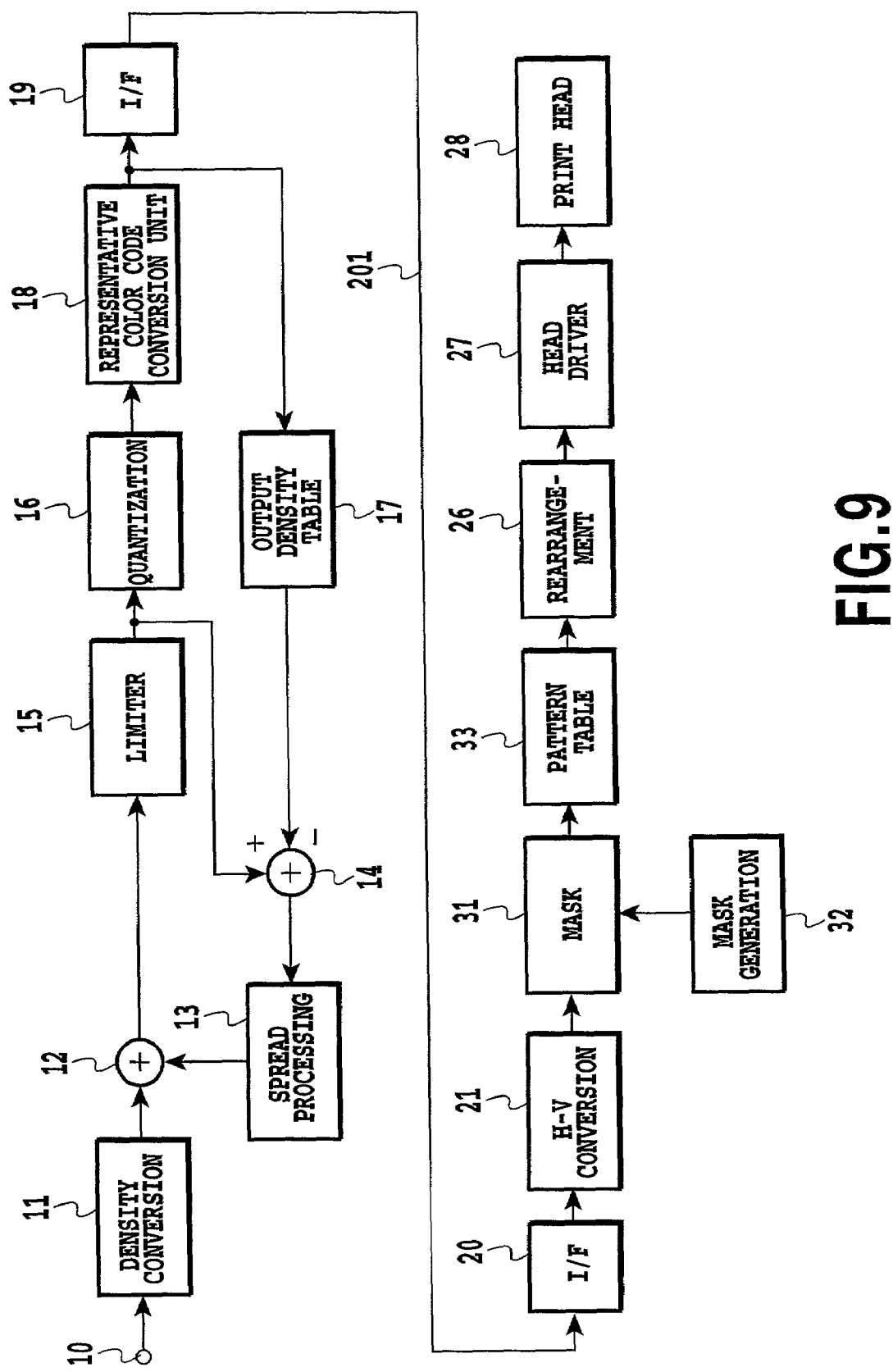
FIG. 9 is a block diagram showing still another example of the image processing unit.

FIG. 9 shows a block diagram of the image processing system according to this embodiment. The host side has the same configuration as that of the embodiment 1, whereas on the printer side a mask processing unit 31 and a mask generation unit 32 are provided following the H-V conversion unit 21 and a pattern processing unit 33 is provided after the mask processing unit 31.

The mask generation unit 32 generates a thinning pattern (also referred to as mask data) associated with the current output pass in units of blocks at 300 dpi and supplies the thinning pattern to the mask processing unit 31. The mask processing unit 31 masks the representative color code output from the H-V conversion unit 21 with the mask pattern of the mask generation unit 32. In this embodiment, because the representative color code for the blank is set to 0, the representative color codes for the blocks that need to be masked are replaced with 0. The pattern processing unit 33 stores dot patterns for the representative colors and converts the representative color code output from the mask processing unit 31 into the associated dot pattern. Then, this dot pattern is printed.

In the multipass printing, the number of mask patterns generated by the mask generation unit 32 corresponds to the number of passes.

Figure 10:
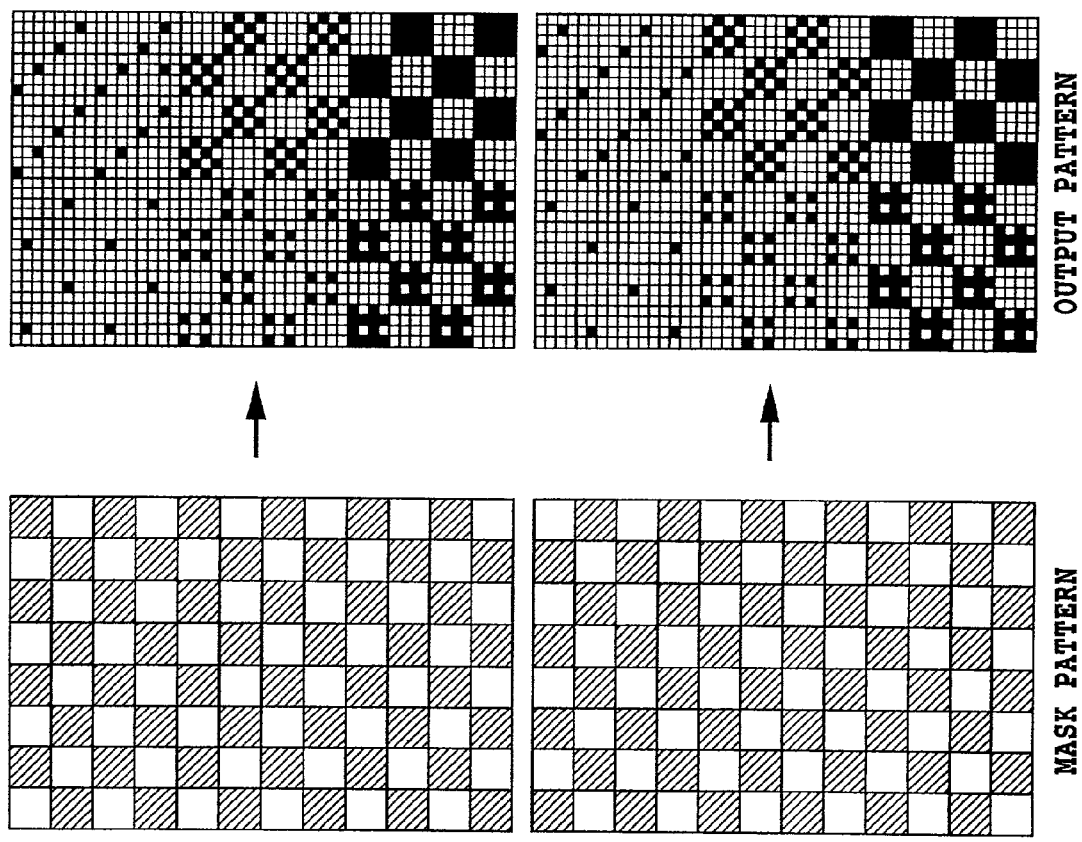
FIG. 10A illustrates bit map data before being divided and FIG. 10B illustrates the structure of dot patterns divided into 2-pass printing.

FIG. 10 shows a concept of the multipass printing according to this embodiment.

In this embodiment, masking is done in units of 4×4-dot blocks, as described earlier.

FIG. 10A shows bit map data for a final image to be formed.

In this embodiment, since this bit map data is printed in two passes, the masking is done by using two mask patterns shown at top left and bottom left in FIG. 10B. A final image formed is a combination of a top right pattern and a bottom right pattern in FIG. 10B.

In this embodiment, the mask has a resolution of 300 dpi and dots within 300 dpi are formed in one and the same pass. Hence, the printing unevenness that occurs within the 300 dpi is mostly attributable to the head characteristic alone. The printing variations due to mechanical accuracy occur concentratedly at the boundary of 300 dpi and are distributed over an entire image, so the printing variation sensitivity with respect to the mechanical accuracy increases as the dot diameter approaches 300 dpi. Since the representative color code for the blank is set to 0, the mask processing unit 31 can be built by taking a logical product(AND) of the representative color code and the mask pattern. If the representative color codes for the blanks are all set to "1," the mask processing unit 31 can be formed by taking a logical sum(OR).

Further, because the masking is done in units of blocks, interferences (beats) between the mask pattern and the bit map, often experienced with the conventional system, do not easily occur. For example, when the pattern shown at the left in FIG. 10 is masked with a checker pattern or reversed check pattern in units of dots, there is a possibility that a pattern may be produced which causes the dots to appear concentratedly on only a particular pass or which eliminates the dots that need to be printed. However, the masking in units of blocks can disperse the dots uniformly as shown at the top right and bottom right.

(Embodiment 4)

Figure 11:
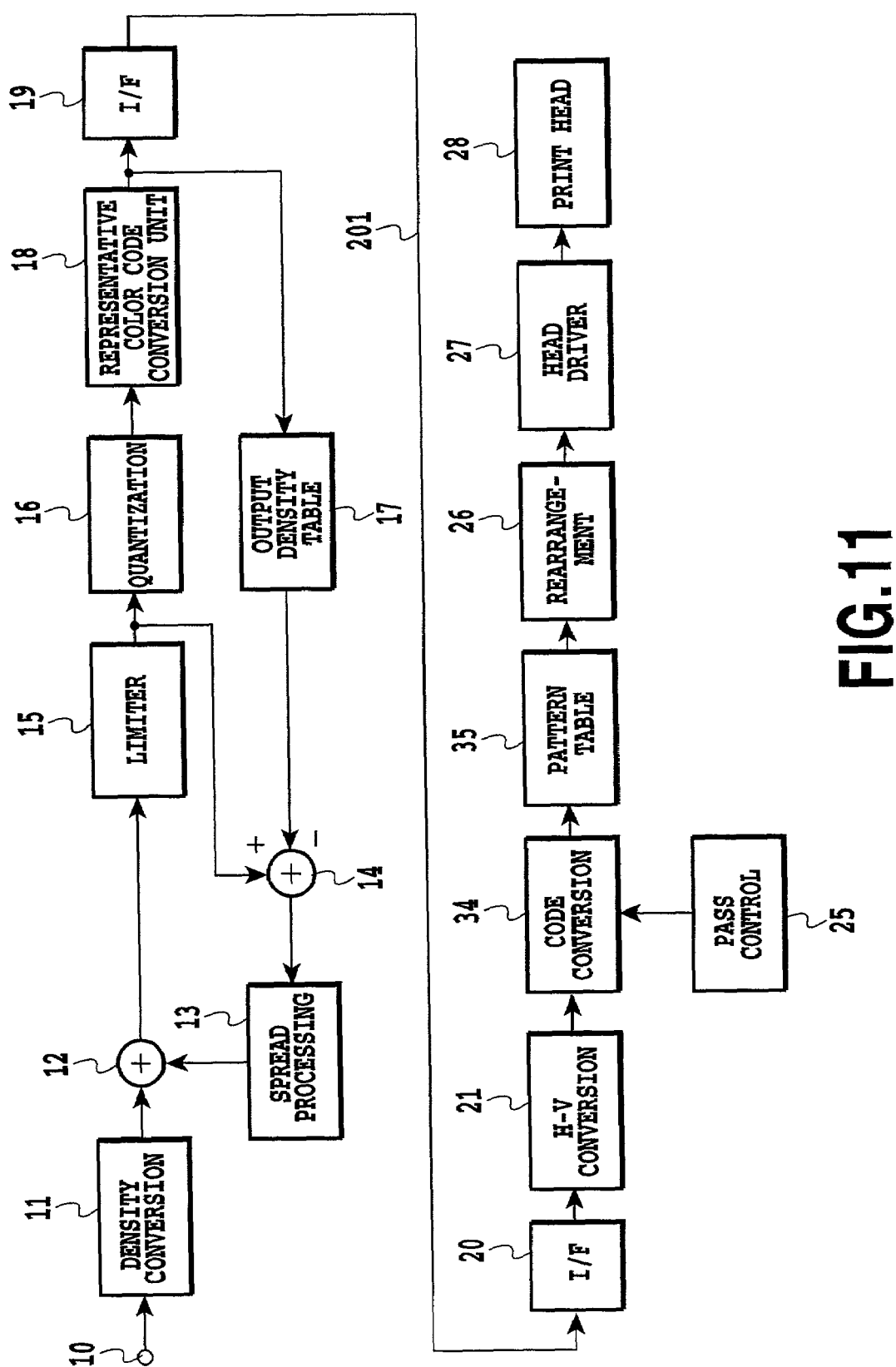
FIG. 11 is a block diagram showing a further example of the image processing unit.

FIG. 11 shows a block diagram of the image processing system according to embodiment 4. The host side has the same configuration as in the embodiment 1, whereas the printer side has after the H-V conversion unit 21 a code conversion unit 34 and a pattern table unit 35.

The code conversion unit 34 converts, according to a control signal from the pass control unit 25, the representative color code output from the H-V conversion unit 21 into an address in the pattern table 35 for each pass. The pattern table 35 stores all dot patterns after they are divided between passes. Upon receiving an address signal from the code conversion unit 34, the pattern table unit 35 generates a 4×4-dot pattern and outputs it to the rearrangement unit 26.

The code conversion unit 34 has a logic or LUT. If the input code is 8 bits long and the number of passes is 2, then the code conversion unit 34 can be constructed of 512×8 LUTs. The pattern table unit 35 needs to store only those patterns that are to be activated. This reduces the capacity of this unit.

FIG. 12 shows a concept of the multipass printing according to this embodiment.

Figure 12B:
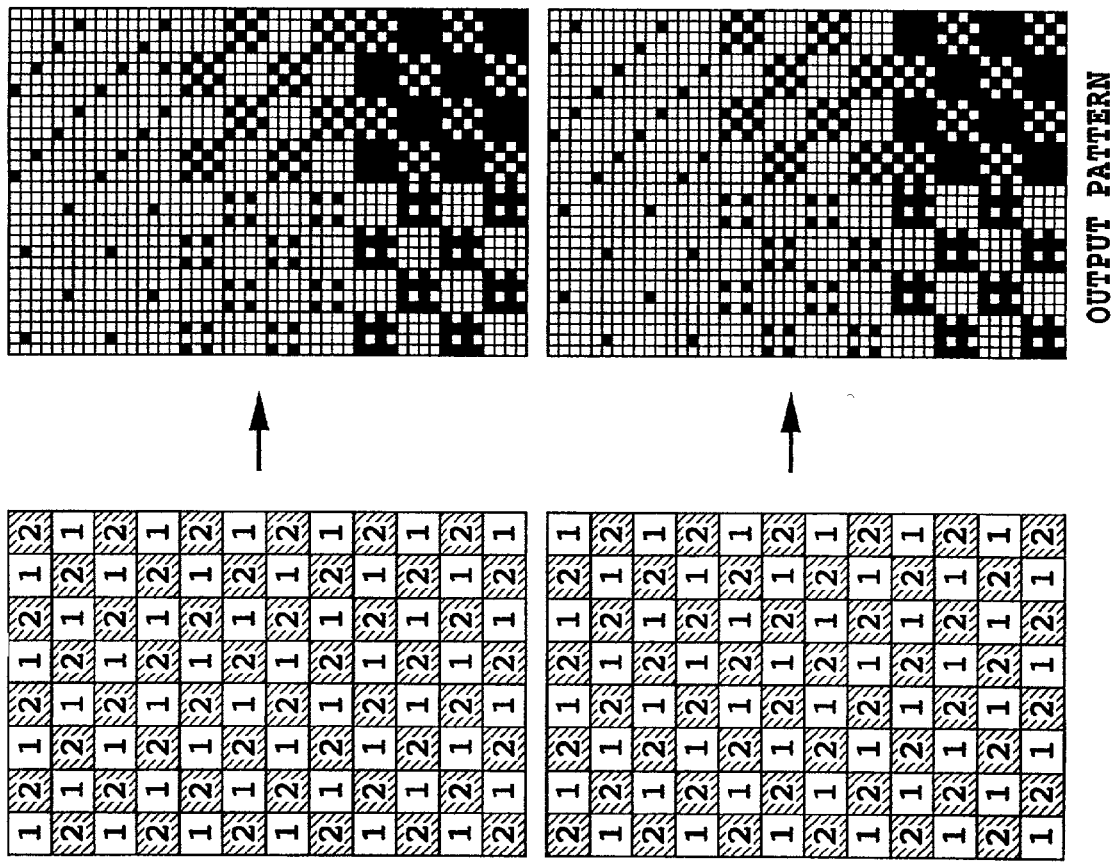
FIG. 12A illustrates bit map data before being divided and FIG. 12B illustrates the structures of dot patterns divided into 2-pass printing.
Figure 12A:
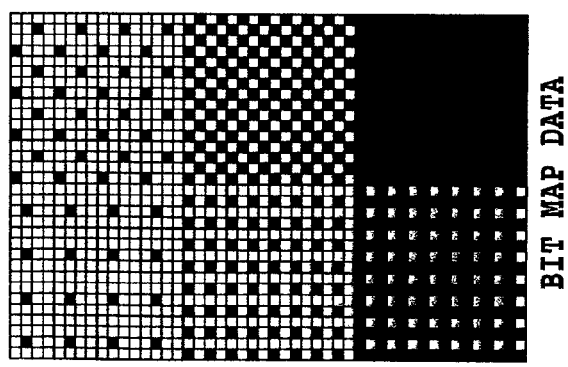

FIG. 12A shows bit map data for a final image to be formed.

In this embodiment because this bit map data is printed in two passes, it is divided into two print data as shown at top left and bottom left in FIG. 12B. This is achieved by changing the addresses in the pattern table 35 in response to the control signal from the pass control unit 25. A final print output is an image produced by combining a top right pattern and a bottom right pattern in FIG. 12B.

In this embodiment, blocks with a mask "2" in other than solid color areas are blank. Thus, the code conversion unit 34 outputs blank addresses (in this embodiment "0") for all blocks with the mask "2" in other than the solid color areas and, for all blocks with the mask "1", outputs addresses corresponding to the dot patterns of the representative colors. For blocks with mask "2" in the solid color areas, addresses corresponding to the dot patterns of intermediate densities are output. Because this arrangement increases the number of solid color blocks, it is effective in enhancing the contrast of black characters.

Such an arrangement is not limited to the example of FIG. 12 and a variety of multipass printing including the patters shown in FIG. 7 and FIG. 10 can be realized by changing a combination of the code conversion unit 34 and the pattern table unit 35.

Although in the embodiments of the present invention the 2-pass printing has been described, the invention can also be applied to the multipass printing with two or more passes. Further, while the mask pattern and the pass control pattern have been described to be a checker pattern, any other pattern may be used.

The present invention achieves distinct effect when applied to a recording head or a recording apparatus which has means for generating thermal energy such as electro-thermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet or solid substances so that the ink faces the electrothermal transducers as described in Japanese Patent Application Laying-open Nos. 54-56847 (1979) or 60-71260 (1985). The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

As described above, in the printing apparatus and printing method according to the present invention, the colors used in forming an image are limited to a predetermined number of color patterns called representative colors in advance. On the host side, the image data received is divided in units of blocks, an appropriate representative color is determined for each block, and the representative colors and the associated representative color codes are sent to the printer side. On the printer side, the representative color codes are converted into dot patterns for each pass by performing a series of processing—resolution conversion, masking/UCR processing, output γ correction and binarization processing. These processing can be integrated into a simple circuit arrangement, allowing for a higher speed of processing.

In an N-pass printing, the output dot pattern is blanked every N dots in the main scan direction and N dots from the last column are also blanked. This arrangement can increase the main scanning speed by N times.

Further, by making a setting such that the total number of dots in the divided dot patterns that are to be output in the multipass printing is greater than the number of output dots in the dot pattern before being divided, the density of solid color areas can be increased, improving the contrast.

The dot resolution of the output dot pattern in the paper feed direction is set higher than that in the main scan direction to reduce the conspicuousness of density variations appearing as horizontal lines caused by paper feed variations.

Further, in storing the dot patterns of the representative colors, those dots that are always blank are omitted. This can reduce the capacity of the pattern table.

Further, because the thinning is done in units of blocks during the multipass printing, the dot patterns of the representative colors are output as is for those blocks that are to be printed. This can simplify the processing and also reduce the capacity of the pattern table. Furthermore, because the code data received is processed (by adding blanks) according to a control signal (pass signal) before converting it into dot patterns, the capacity of the pattern table can also be reduced.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A printing system, which uses a print head having a plurality of print elements and performs a plurality of scans of the print head over a same area so as to make correspondence of different print elements of the print head to the same area from one of the plurality of scans to another scan, for printing a plurality of dot patterns, the printing system comprising:

a code table used for convening respective data representative of each one of a plurality of input colors to a respective one of the plurality of representative color codes; and pattern generation means for generating a respective one of the dot patterns corresponding to each one of the input colors by convening each one of the representative color codes associated with a respective one of the input colors to a corresponding dot pattern;

wherein the dot pattern generation means includes a plurality of pattern tables each corresponding to a respective one of the plurality of scans, each one of the pattern tables storing the dot pattern that is of a block of 4×4 matrix, the dot pattern generation means generates the dot pattern to be printed in each of the plurality of scans based on the plurality of pattern tables in which one pattern table for one scan stores the dot pattern corresponding to one of the color codes and each of remaining tables stores the dot patterns having no dots, if the number of dots in the combined blocks of plurality of scans is equal to or less than a predetermined number, and the dot pattern generation means generates the dot pattern to be printed in each of the plurality of scans, a dot pattern formed by combining the dot patterns corresponding to the plurality of scans has a dot pattern in which dot density in a direction different from a direction of the scan is greater than that in the scan direction, if the number of dots in the blocks of plurality of scans is greater than the predetermined number.

2. A printing system according to claim 1, further comprising:

an output density table for converting each one of the representative color codes to respective density data, the density data being stored in the output density table and having been obtained by printing each one of the dot patterns corresponding to a respective one of the representative color codes and measuring the density of each one of the printed dot patterns; and error calculation means for determining an output density error between respective data representative of a density of one of the input colors and the density data of a dot pattern corresponding to a respective one of the representative color codes associated with one of the input colors;

wherein the output density error determined by the error calculation means is spread over respective data representative of respective densities of the input color of input pixels other than the one of the away of input pixels.

3. A printing system according to claim 1, wherein the plurality of pattern tables store the dot patterns after removal of dot pattern data representing blanks in respective print pixel areas where each one of the dot patterns to be stored is printed, the same operation of removal being performed for each dot pattern in a given table, and the pattern generation means further includes interpolation means for replacing the removed dot pattern data for each portion of the dots of a dot pattern selected for printing.

4. A printing system according to claim 1, wherein the pattern generation means has a mask generation unit for generating mask patterns and for using mask signals corresponding to the generated mask patterns for generating each one of the dot patterns corresponding to a respective one of the representative color codes selected for printing.

5. A printing system according to claim 1, wherein the pattern generation means has address output means for outputting respective addresses corresponding to the representative color codes for each one of the plurality of scans, and has at least one pattern table for convening each address from the address output means to a respective portion of the dots of one of the dot patterns to be printed in one of the plurality of scans corresponding to the address.

6. A printing method, which uses a print head having a plurality of print elements and performs a plurality of scans of the print head over a same area so as to make correspondence of different print elements of the print head to the same area from one of the plurality of scans to another scan, for printing a plurality of dot patterns, the printing method comprising the steps of:

converting respective data representative of each one of a plurality of input colors to a corresponding one of the representative color codes from a code table based; and generating dot patterns corresponding to respective ones of the representative color codes, wherein the step of generating the dot patterns comprises using a plurality of pattern tables each corresponding to a respective one of the plurality of scans and storing dot patterns that is of a block of 4×4 matrix, the step of generating the dot patterns comprises generating the dot pattern to be printed in each of the plurality of scans based on the plurality of pattern tables in which one pattern table for one scan stores the dot pattern corresponding to one of the color codes and each of remaining tables stores the dot patterns having no dots, if the number of dots in the combined blocks of plurality of scans is equal to or less than a predetermined number, and the step of generating the dot patterns comprises generating the dot pattern to be printed in each of the plurality of scans, a dot pattern formed by combining the dot patterns corresponding to the plurality of scans has a dot pattern in which dot density in a direction different from a direction of the scan is greater than that in the scan direction, if the number of dots in the blocks of plurality of scans is greater than the predetermined number.

7. A printing method according to claim 6, further comprising the steps of:

storing output density data in an output density table by matching respective output density data to each one of the representative color codes, the output density data being stored in the output density table having been obtained by printing each one of the dot patterns corresponding to a respective one of the representative color codes and measuring the density of each one of the printed dot patterns; and determining an output density error between respective data representative of the density of one of the input colors and the density data of one of the dot patterns corresponding to a respective one of the representative color codes associated with a respective one of the input colors;

wherein the step of determining the output density errors includes spreading the determined output density error for each one of the input colors over respective data representative of respective densities of the one of the input colors of input pixels other than one of the away of input pixels.

8. A printing method according to claim 6, wherein respective data representing each one of the dot patterns are compressed before being stored in the pattern tables by removing those dot pattern data representing blanks in respective printed pixel areas in which the dot patterns are printed, the same operation of removal being performed for each dot pattern in a given table, the removed dot pattern data being replaced in each portion of each one of the dot patterns obtained using the pattern tables.

9. A printing method according to claim 6, wherein the step of generating the dot patterns includes generating mask patterns and using mask signals from the generated mask patterns to generate each dot pattern corresponding to a respective one of the representative color codes.

10. A printing method according to claim 6, wherein the step of generating the dot patterns includes generating addresses corresponding to respective ones of the representative color codes for each one of the plurality of scans and using the generated addresses to obtain respective portions of each one of the dot patterns corresponding to the addresses from pattern tables.

* * * * *

UNITED STATES PATENT AND TRADEMARK OFFICE
CERTIFICATE OF CORRECTION

| | | |
|---|---|---|
| PATENT NO. | : 7,139,096 B2 | Page 1 of 2 |
| APPLICATION NO. | : 09/983102 | |
| DATED | : November 21, 2006 | |
| INVENTOR(S) | : Hisashi Ishikawa | |

It is certified that error appears in the above-identified patent and that said Letters Patent is hereby corrected as shown below:

ON THE TITLE PAGE [56] REFERENCES CITED:

U.S. Patent Documents, insert
--6,007,174   12/28/99   Hirabayashi, et al.   347/14
  5,748,772   5/5/98     Moro, et al.          382/167
  4,740,796   4/26/88    Endo, et al.          346/1.1
  4,723,129   2/2/88     Endo, et al.          346/1.1
  4,558,333   12/10/85   Sugitani, et al.      346/140
  4,463,359   7/31/84    Ayata, et al.         346/1.1
  4,459,600   7/10/84    Sato, et al.          346/140
  4,345,262   8/17/82    Sirato, et al.        346/140--.

Foreign Patent Documents, insert
--EP   0 982 143      03/01/00
  EP   0 941 852      09/15/99
  JP   59-138461      8/8/84
  JP   59-123670      7/17/84
  JP   60-71260       4/23/85
  JP   54-56847       5/8/79
  JP   2000-141715A   5/23/00
  JP   11-004340A     1/06/99
  JP   11-216904A     8/10/99--.

Other Patent Documents, "Gonzales, Rafael C, Digital Image Processing.
1992, Addison Wesley Publishing, pp. 354-357*" should be deleted.

COLUMN 3:

Line 62, "EMBODIMENT" should read --EMBODIMENTS--.

Signed and Sealed this

Eighth Day of June, 2010

David J. Kappos
*Director of the United States Patent and Trademark Office*

COLUMN 4:

Line 33, "which" should read --to which--.

COLUMN 7:

Line 42, "produce" should read --produces--; and
    Line 55, "point." should read --points.--.

COLUMN 10:

Line 50, "showed" should read --shown--; and
    Line 51, "that has" should read --that it has--.

COLUMN 13:

Line 38, "patters" should read --patterns--.

COLUMN 14:

Line 35, "may consists" should read --may consist--.

COLUMN 15:

Line 46, "These" should read --These steps of--.

COLUMN 16:

Line 25, "convening" should read --converting--; and
    Line 31, "convening" should read --converting--.

COLUMN 17:

Line 7, "away" should read --array--; and
    Line 28, "convening" should read --converting--.

COLUMN 18:

Line 30, "the one" should read --one--; and
    Line 31, "away" should read --array--.